July 10, 1945.   J. H. MILLSTEIN   2,379,981
CANDY CONTAINING TOY TELEPHONE
Filed July 5, 1944
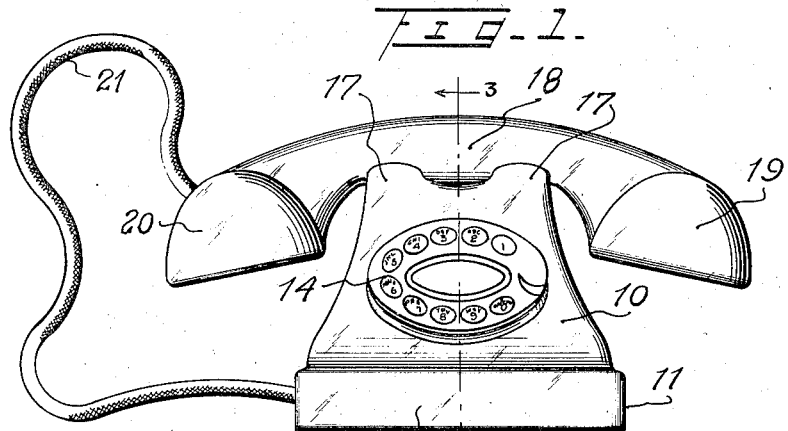
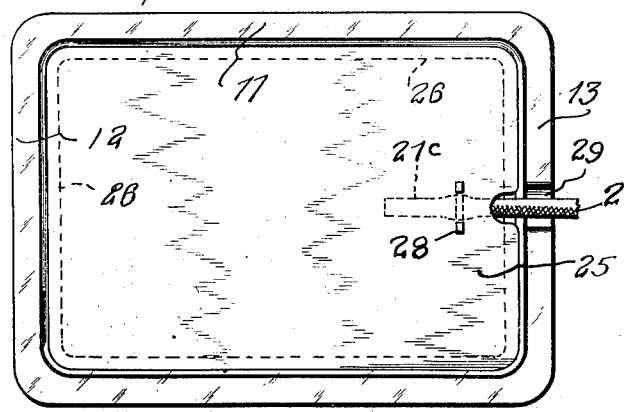
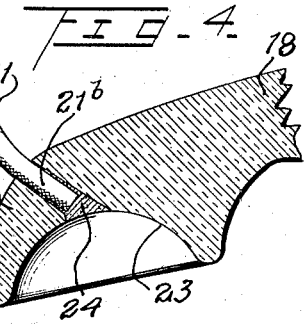
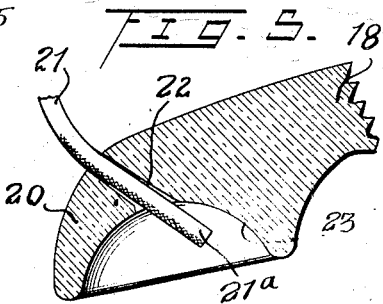
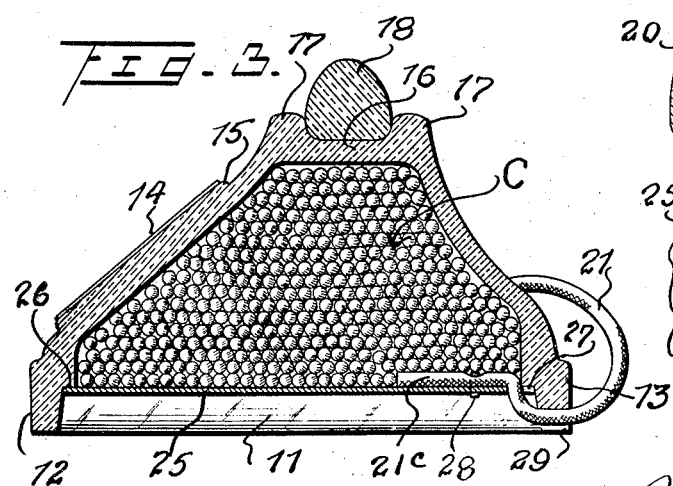
JACOB H. MILLSTEIN Patented July 10, 1945

2,379,981

UNITED STATES PATENT OFFICE 2,379,981

CANDY CONTAINING TOY TELEPHONE

Jacob H. Millstein, Jeannette, Pa.

Application July 5, 1944, Serial No. 543,543

3 Claims. (Cl. 46—11)

This invention relates to certain new and useful improvements in a candy containing toy telephone.

The primary object of the invention is to provide a receptacle for candy in the form of a toy telephone, preferably of the "French" type and one that is extremely attractive in appearance, inexpensive to manufacture, and further capable of use as a desk ornament or paper weight.

A further object of the invention is to provide a candy containing toy telephone in which the body or base of the phone is hollow to form a receptacle for candy with a bottom closure wall for the base readily removable therefrom to permit access to the candy contents.

A still further object of the invention is to provide a candy containing toy telephone in which the hollow candy containing base is preferably formed of transparent glass so that the candy contents may be viewed through the walls of the base with the combination receiver and transmitter that may be also formed of glass or a suitable plastic having a simulated electrical cord connection with the base and specifically with the removable closure for the open bottom of the candy containing base to facilitate removal of the closure for access to the candy content.

It is a further object of the invention to provide a candy containing telephone of the foregoing character wherein the simulated electrical cord extending from the combination receiver and transmitter to the bottom closure for the candy containing base is securely anchored as by a suitable plastic or the like to one end of the combination receiver and transmitter.

With the above and other objects in view that will become apparent as the nature of the invention is better understood, the same consists in the novel form, combination and arrangement of parts hereinafter more fully described, shown in the accompanying drawing and claimed.

In the accompanying drawing:

Figure 1 is a front elevational view of a candy containing toy telephone constructed in accordance with the present invention, the same being of the "French" type, Figure 2 is a bottom plan view showing the cord connection between one end of the combination receiver and transmitter and the removable plate closure for the open bottom of the candy containing base, Figure 3 is a vertical longitudinal sectional view taken on line 3—3 of Figure 1, Figure 4 is a fragmentary sectional view of the transmitter end of the combination receiver and transmitter, showing the plastic anchored end of the simulated telephone cord therein, Figure 5 is a detail sectional view, similar to Figure 4, showing the initial position of the cord preparatory to the placement of the anchoring plastic around the end thereof, and Figure 6 is a fragmentary plan view of the bottom closure for the hollow base with the telephone cord attached thereto and employed as a pulling element for removing the closure.

As illustrated, the candy containing toy telephone is of the "French" type and comprises a hollow base 10 formed of slanting side and end walls terminating at their lower ends in a rectangular frame flange having sides 11, a front flange 12, and a rear flange 13. The front wall of the hollow base 10 carries on the outer face thereof a simulated dial 14 in the form of a paper or cardboard ring that may be adhesively or otherwise secured to an upstanding disk-like projection 15. The hollow base 10 is open at its lower side while the smaller top wall 16 is flat and rectangular and carries upstanding corner lugs 17.

The combination receiver and transmitter comprises an arcuate arm 18 adapted to rest upon the flat top wall 16 of the base and retained against accidental displacement by the corner lugs 17 and said arm 18 carries at one end a simulated receiver 19 and at its other end a simulated transmitter 20. One end of a simulated telephone cord 21 is secured to the transmitter 20 as illustrated in Figures 4 and 5.

While the transmitter 20 may have an opening formed in the outer convex face thereof approximating the adjacent end of the arm 18 for the reception and anchoring of the cord 21, it is preferably intended to anchor such cord end by forming an opening 22 extending completely through the transmitter 20 and opening at the concave side 23 thereof. The end 21ᵃ of the cord is first extended into the opening 22 which flares slightly inwardly as shown in Figure 5 and a plastic material or other adhesive is placed around the inner end 21ᵃ of the cord and into the concave side 23 of the transmitter so that when the cord 21 is drawn into the position shown in Figure 4, the end 21ᵇ thereof will be spaced inwardly of the concave face 23 with the plastic material 24 surrounding the inner terminal end 21ᵇ of the cord and also filling the inner end of the tapered opening 22.

The other end of the cord 21 as shown at 21ᶜ is attached to a removable closure plate 25 for the open bottom of the hollow base 10 and as shown in Figures 2, 3, and 6, a rectangular abutment shoulder 26 is carried inwardly of the bottom flanges 11, 12, and 13 of the hollow base, the inner walls of said flanges being slightly inclined with the marginal edges of the rectangular closure 25 frictionally engaged therewith when moved into abutting engagement with the rectangular shoulder 26. The closure 25 may be constructed of any suitable material, such as cardboard or the like. The end of the closure 25 adjacent the rear wall flange 13 has an edge notch 27 through which the end 21c of the cord passes to overlie the upper face of the closure 25 and be anchored thereto by a pin clip 28 or other suitable fastening means. Also, the lower edge of the flange 13 is notched as at 29 to permit the cord 21 to pass outwardly of the hollow base in a plane above the lower ends of the wall flanges 11, 12, and 13 so that the candy containing toy telephone may have a flat and even contact with a support.

Candy of any suitable character indicated by the reference character C is carried within the hollow base 10 and when in the form of variously colored pellets or the like presents an unusually attractive appearance through the transparent walls of the base. To obtain access to the candy contents, the combination receiver and transmitter is removed from the base with the latter inverted and a pull on the cord 21 separates the closure 25 from the hollow base for access to the candy contents.

From the above detailed description of the invention, it is believed that the construction and use thereof will at once be apparent, and while there is herein shown and described the preferred embodiment of the invention, it is nevertheless to be understood that minor changes may be made therein without departing from the spirit and scope of the invention as claimed.

I claim:

1. In a candy containing toy telephone, a hollow transparent base open at the bottom thereof, a closure plate removably attached to the open bottom, a combination receiver and transmitter, and a cord connection between the transmitter and closure plate with said cord adapted for use as a pull device to remove the closure plate from the opening in the base, said closure plate and base having notches therein for the passage of the cord through the base notch above the lower edge of the base with the cord overlying the closure plate and means for securing the cord to the plate.

2. In a candy containing toy telephone, a hollow transparent base open at the bottom thereof, a closure plate removably attached to the open bottom, a combination receiver and transmitter, and a cord connection between the transmitter and closure plate with said cord adapted for use as a pull device to remove the closure plate from the opening in the base, the connection between the cord and transmitter including an opening in the transmitter into which one end of the cord is extended and a plastic within said opening surrounding the end of the cord for securing the cord in the opening.

3. In a candy containing toy telephone, a hollow transparent base open at the bottom thereof, a closure plate removably attached to the open bottom, a combination receiver and transmitter, and a cord connection between the transmitter and closure plate with said cord adapted for use as a pull device to remove the closure plate from the opening in the base, said closure plate and base having notches therein for the passage of the cord through the base notch above the lower edge of the base with the cord overlying the closure plate and means for securing the cord to the plate, the connection between the cord and transmitter including an opening in the transmitter into which one end of the cord is extended, and a plastic within said opening surrounding the end of the cord for securing the cord in the opening.

JACOB H. MILLSTEIN.